July 24, 1934.  F. D. JONES  1,967,774
TRACTOR PUSHED IMPLEMENT
Filed April 1, 1933  2 Sheets-Sheet 1

WITNESS.
Edward Melin.

INVENTOR
Frank D. Jones
BY Brown, Jackson, Boettcher & Dienner
ATTORNEYS.

July 24, 1934.   F. D. JONES   1,967,774
TRACTOR PUSHED IMPLEMENT
Filed April 1, 1933   2 Sheets-Sheet 2
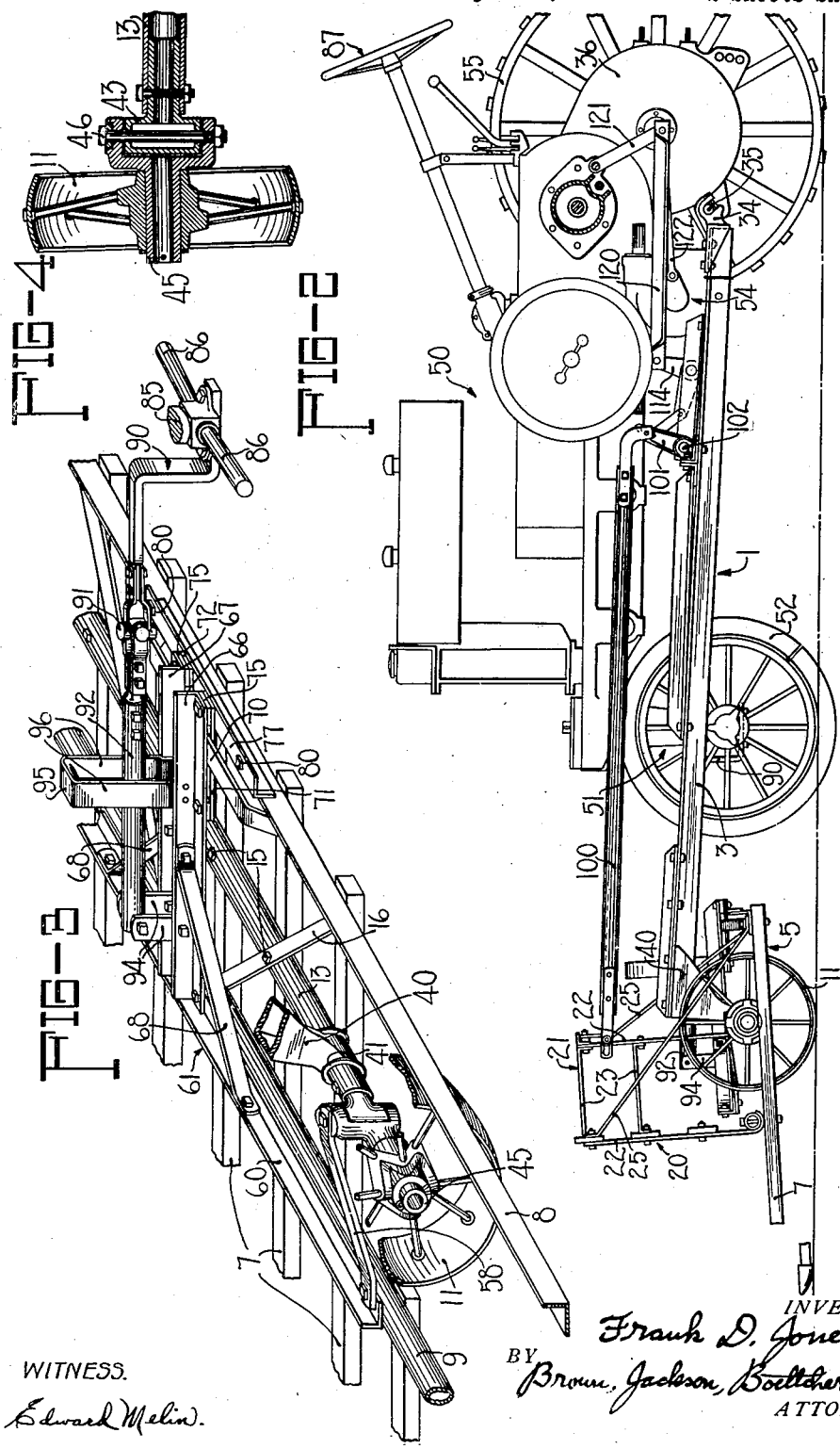
WITNESS.
Edward Melin.
INVENTOR
Frank D. Jones
BY Brown, Jackson, Boettcher & Dienner
ATTORNEYS.

Patented July 24, 1934

1,967,774

UNITED STATES PATENT OFFICE 1,967,774

TRACTOR PUSHED IMPLEMENT

Frank D. Jones, Ottumwa, Iowa, assignor to Dain Manufacturing Company of Iowa, Ottumwa, Iowa, a corporation of Iowa Application April 1, 1933, Serial No. 663,900

21 Claims. (Cl. 56—27)

The present invention relates generally to agricultural implements and is particularly concerned with the provision of tractor pushed implements having dirigible wheels interconnected with the dirigible wheels of the tractor so that the wheels are steered together in substantially the correct differential relationship.

More particularly, the principal object of the present invention is the provision of new and improved connections between the dirigible wheels of the tractor and the dirigible wheels of the implement whereby the correct differential relation is maintained by means which is relatively simple yet sturdy and strong.

Another object of the present invention is the provision of interconnecting means between the dirigible wheels of the tractor and the dirigible wheels of the implement which is especially arranged to accommodate relative movement between the implement and the tractor while maintaining at all times the correct differential relationship referred to above.

Another object of the present invention relates to the provision of new and improved means for tilting the implement about the axis of its dirigible wheels by means deriving power from the power lift of the tractor.

Specifically, another object of the present invention is the provision of a sweep rake embodying some or all of the features above referred to, but it is to be understood that, generically speaking, the present invention is not necessarily limited to a sweep rake or a similar implement.

These and other objects of the present invention will be apparent from the following description of the preferred embodiment, taken in conjunction with the accompanying drawings illustrating such embodiment.

In the drawings:

Figure 2 is a side elevation of the construction shown in Figure 1;

Figure 3 is a fragmentary perspective view, illustrating the connections between the dirigible wheel means of the implement attachment and the steering truck of the tractor; and Figure 4 is a transverse vertical section taken through one of the dirigible wheels of the implement.

Figure 1:
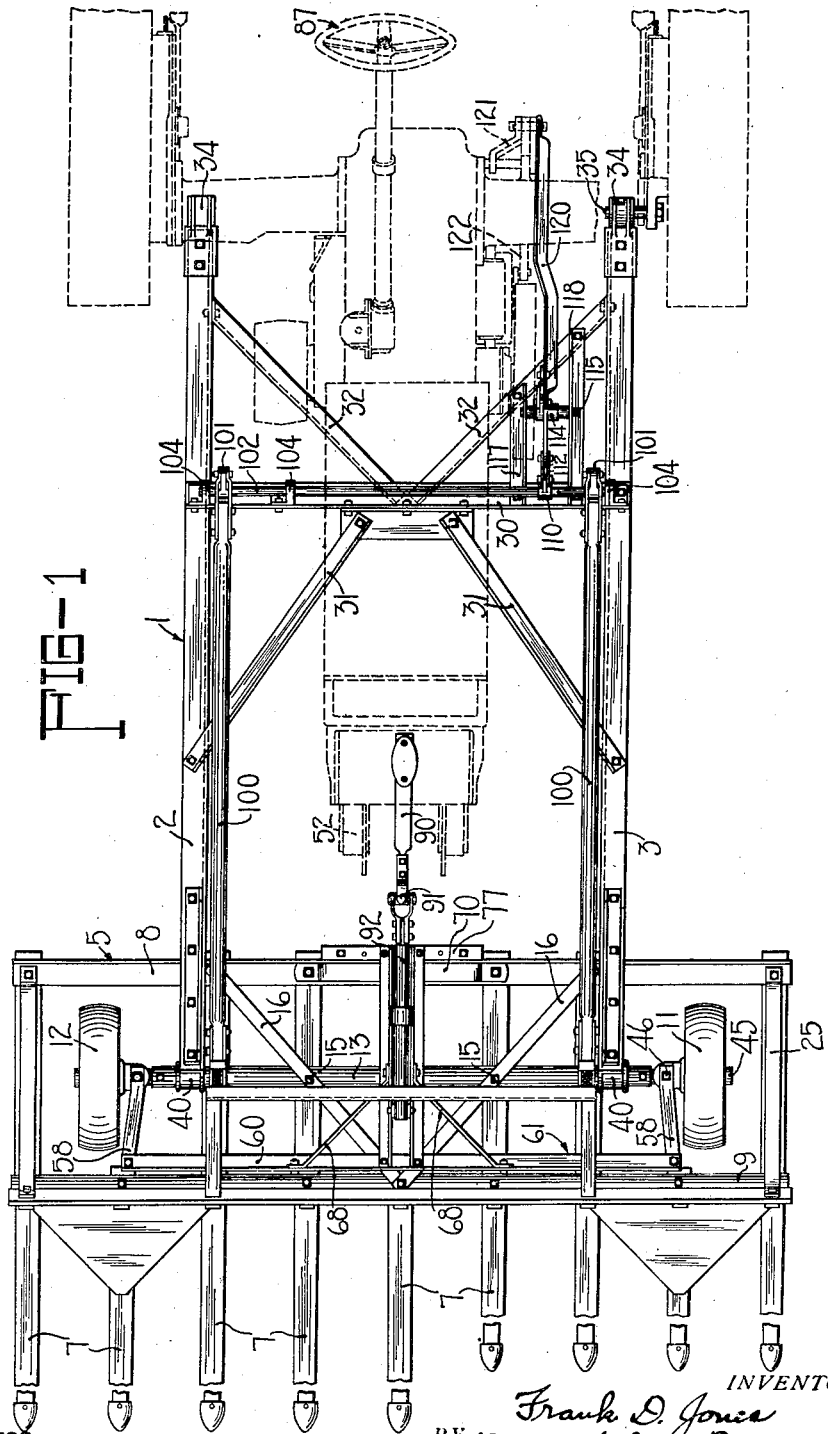
Figure 1 is a top plan view of a machine embodying the principles of the present invention and in which the tractor is indicated in dotted lines while the implement attachment is indicated in full lines.

Referring now more particularly to Figure 1, the invention has been illustrated in connection with a sweep rake which includes a rake frame 1 embodying longitudinally disposed frame members 2 and 3, and a rake head 5 which comprises a series of forwardly extending raker bars or teeth 7 which are fixedly connected to a rear transverse angle member 8 and a second transverse member 9 spaced forwardly of the rear transverse member 8. Preferably, the transverse member 9 is in the form of a pipe but this construction may, of course, vary as desired.

The rake head 5, in connection with the rake frame 1, constitutes an implement frame which is supported, at least in part, by laterally spaced dirigible wheels 11 and 12 and cooperating axle means 13 in the form of a transversely disposed beam rigidly connected with the rake head 5. Preferably, certain of the rake teeth 7 are bolted, as at 15, to the transverse axle beam 13, and suitable diagonal braces 16 are provided for the purpose of strengthening the rake head 5. Preferably, although not necessarily, the latter is provided with the usual back board 20 supported on the rake head 5 by means of a framework 21 composed of suitable verticals 22 and horizontals 23 rigidly connected together by bolts or the like. The framework 21 also includes suitable brace members 25.

The rake frame 1 and the two longitudinally extending members 2 and 3 constitute, in effect, a pushing frame, and the rear ends of the frame members 2 and 3 are connected together by means of a transverse member 30 and pairs of diagonal braces 31 and 32. Yokes in the form of castings 34 or the equivalent are connected to the rear ends of the frame members 2 and 3, and these yokes are fork-shaped to engage bolts 35 extending laterally inwardly from the chain or drive housings 36 of the tractor. Bolts passing through the ends of the forks serve to hold the rake frame in position with respect to the rear axle of the tractor.

Depending castings 40 are rigidly secured to the forward ends of the frame members 2 and 3. These castings extend downwardly and forwardly, and at their forward ends they are provided with bearing sleeves 41 in which the axle beam 13 is journaled.

Laterally outwardly of each of the castings 40, the axle beam 13 of the implement is provided with knuckle pieces 43, and on each of the knuckle pieces a stub shaft 45 is pivotally mounted for movement about a vertical axis by means of a bolt 46. The dirigible wheels 11 and 12 are journaled on the stub shafts 45, as best shown in Figure 4.

The tractor, with which the implement is adapted to be connected, is indicated in its entirety by the reference numeral 50 and is of conventional construction, embodying a front steering truck 51 provided with dirigible wheels 52. The tractor 50 also includes the usual power lift mechanism 54 and rear driving wheels 55. The dirigible wheels 11 and 12 of the rake are differentially connected with the dirigible wheels 52 of the front steering truck 51 by means which will now be described. The steering yokes 45 of the implement are provided with steering arms 58, the rear ends of which are rigidly connected to the steering yokes and the forward ends thereof are connected together by a transverse angle member 60 forming a part of a steering frame 61 slidable or shiftable lateraly on the rake head or implement frame and adapted by such movement to steer the dirigible wheels 11 and 12 of the implement. The steering frame 61 is made up of two laterally spaced longitudinally extending angle members 66 and 67 connected at their forward ends to the angle member 60 and braced by means of diagonal braces 68. At its rear end the steering frame 61 is slidably supported upon a bar 70 carried by the rear angle member 8 of the rake head. Guideways are provided on the steering frame 61 to accommodate the bar 70, the guideways being formed by plates 71 and 72 which are fixed to the underside of the angle members 66 and 67 by means of spacers 75. The rear end of the steering frame 61 is further supported for sliding movement by means of an angle member 77 fixed to the vertical flange of the transverse member 8, the top flange of the member 77 supporting and receiving the plates 71 and 72, as best shown in Figure 3. Bolts 80 may be carried by the top flange of the angle member 77 to limit the lateral movement of the steering frame 61.

The front steering truck 51 of the tractor includes a vertical shaft 85 and associated wheel spindles 86 adapted to be turned laterally by suitable mechanism under the control of the steering means 87 of the tractor. The steering frame 61 is moved transversely with respect to the implement frame to steer the dirigible wheels 11 and 12 by means of a connection with the steering shaft 86 of the front steering truck. This connection includes an arm 90 bolted to the axle or shaft 85 so as to be laterally swingable therewith and to extend forwardly therefrom. The arm 90 is bent upwardly and forwardly, as best shown in Figure 3, and at its forward end it is connected by means of a universal joint 91 with a pipe member 92. The forward end of the longitudinally extending member 92 is connected with the steering frame 61 by means of a pair of links 94 which are themselves pivotally connected with the angle members 66 and 67 of the steering frame 61. The links 94 are swingable in a vertical longitudinal plane so that the pipe member 92 is capable of a limited amount of fore and aft shifting with respect to the steering frame and the implement.

The pipe member 92 is prevented from swinging laterally with respect to the steering frame 61, and hence it is movable bodily laterally therewith, by means of an upwardly extending U-shaped guide 95 between the arms 96 of which the pipe member 92 passes. The lower ends of the arms 96 are rigidly secured to the vertical flanges of the angle members 66 and 67.

As will be clear from Figure 2, it will be observed that the implement 5 may tilt about a transverse axis passing through the dirigible wheels 11 and 12, and in doing so relative vertical movement will occur between the longitudinal steering member 92 and the steering frame 61 and associated parts, this relative vertical movement being permitted by virtue of the vertical guide member 95. When the steering truck 51 of the tractor is steered, the arm 90 rotates with the steering axle 85. This movement of the arm 90 causes the steering frame 61 to shift laterally and to steer the dirigible wheels 11 and 12 through the connection between the steering frame and the arms 58. In transmitting steering movement to the steering frame 61, the longitudinal member 92 moves fore and aft with respect to the steering frame, due to the fact that the universal joint 91 moves in the arc of a circle concentric with respect to the steering axis defined by the shaft 85. The fore and aft movement of the member 92 is permitted by virtue of the links 94 rocking slightly in a vertical plane about their pivotal connection with the vertical flanges of the angle members 66 and 67.

It will also be observed that tilting movement of the implement as a whole also causes relative movement between the longitudinally disposed member 92 and the steering frame 61.

This tilting movement of the implement may be caused by the uneven ground over which the machine is being driven and, in implements such as a sweep rake or the like, the rake proper may be tilted in a vertical plane from its forwardly and downwardly inclined hay receiving position to a horizontal or substantially horizontally carrying position, in either case there occurring relative rocking movement of the implement about the journals 41.

It is important to note that the rake frame 1 forms a rigid unit having great strength against lateral stresses and that this rigid framework is pivotally connected with the tractor at points which are widely separated. By virtue of this construction, the sweep rake or other implement associated therewith is maintained in alignment with the body of the tractor at all times without the provision of any connections or the like between the implement frame and the front end of the tractor, such as rub plates, chains or the like, as is necessary in many of the prior art constructions. In the present construction, without chains or the like, the implement is maintained in accurate alignment even when the machine is turned sharply enough, as by using the tractor differential brakes, to force the tractor to pivot about one of the rear wheels and to cause the implement wheels 11 and 12 to skid.

In rakes and the like, it is desirable to be able to rock the rake head to and from hay receiving and hay carrying position by means deriving power from the power lift of the tractor. To this end, the present invention contemplates the provision of a pair of longitudinally extending beam members 100, the forward ends of which are loosely connected with the upper portions of the framework 21 of the rake head 5. Preferably, such means includes springs or the like by which the rake teeth 7 may be pressed downwardly into engagement with the ground during raking position. At their rear ends, the beam members 100 are pivotally connected with arms 101 carried by a transverse rock shaft 102 rockably supported in bearings 104 which are carried by the transverse frame member 30.

In order to provide means for operating the rock shaft 102, the latter is provided with a third arm 110 fixed thereto and which is connected by means of links 112 to one arm of a bell crank 114 journaled on a pin or short shaft 115. The short shaft 115 is carried on two supports 117 and 118 bolted to the transverse member 30 and to one of the braces 32. The other arm of the bell crank 114 is connected by means of a link 120 with a fore and aft swinging pendulum link 121 supported from the rear axle of the tractor, and adjacent the connections 35 between the tractor and the frame members 2 and 3 of the implement. The pendulum link 121 is connected by means of a link 122 with the power lift 54 of the tractor.

By virtue of the construction described above, operation of the power lift 54 swings the rock shaft 102 and causes the raising and lowering of the implement frame 5. By virtue of the links 120 and 122, the latter being supported on the tractor while the link 120 is connected to be movable vertically with the implement frame and both being connected together adjacent pivotal connections between the implement frame and the tractor, the position of the rock shaft 102 on the implement frame is not materially effected by rise and fall of the implement itself.

The operation of the machine described above is believed to be apparent from the foregoing description. When the implement is arranged as shown in Figure 2, the teeth 7 are in raking position, the implement being capable of vertical movement with respect to the tractor, both bodily and about a transverse pivot axis passing substantially through the axle member 13. When the front steering truck of the tractor is steered by the usual steering means 87 of the tractor, the arm 90 is caused to swing laterally, thereby bodily shifting the steering frame 61 by sliding the same relative to the guide 70 and the angle bar 77, the longitudinally disposed steering member 92 reacting against the vertically disposed U-shaped guide 95 to occasion this bodily shifting movement which, as will be understood, steers the dirigible wheels 11 and 12 differentially with respect to the dirigible wheels 52 of the tractor. The mounting of the steering member 92 so that it is capable of relative fore and aft movement between the arms 96 of the guide 95 accommodates, not only the bodily tilting movement of the implement 5 about its own axis, but also the arcuate movement of the present end of the arm 90 relative to the bodily lateral movement of the steering member 92. Operation of the power lift 54 of the tractor swings the bell crank 114 which, in turn, rocks the shaft 102 to swing the beams 100 forwardly or rearwardly, thereby raising or lowering the forward ends of the rake teeth and tilting the implement 5 about a transverse axis.

While I have described above certain preferred structure in which the principles of the present invention have been embodied, it will be apparent to those skilled in the art that my invention is not to be limited to the specific means shown and described, but that, in fact, widely different means may be employed in the practice of the broader aspects of my invention.

What I claim, therefore, and desire to secure by Letters Patent is:

1. The combination with a tractor supported on a steering truck, of an implement frame disposed adjacent the tractor and connected therewith for relative vertical movement, dirigible wheel means supporting said implement frame and steerable differentially with respect to said steering truck, and a steering member connected with said dirigible wheel means to steer the same and having one end carried by the frame for substantially vertical swinging movement about a transverse axis, and means connecting said steering member with said truck whereby steering movement of the latter shifts said steering member bodily laterally to steer said dirigible wheel means.

2. The combination with a tractor supported at least in part on a steering truck, of an implement frame disposed adjacent the tractor and connected therewith for relative vertical movement, dirigible means supporting said implement frame, and means connecting said dirigible means with said steering truck and including an arm fixedly secured to and movable with the steering truck, a member connected with said dirigible wheel means and adapted to have relative vertical movement with respect thereto to accommodate the vertical movement of said implement, means connecting said member with said dirigible wheel means and providing for relative fore and aft movement but preventing lateral swinging movement with respect thereto, and means connecting said member with one end of said arm.

3. The combination with a tractor having a steering truck, of an implement frame disposed adjacent the tractor and connected therewith for vertical movement with respect thereto, spaced dirigible wheels supporting the implement frame, and means connecting the dirigible wheels with the steering truck of the tractor, said means including an arm movable with said truck, means connecting said dirigible wheels and operative upon lateral movement thereof to steer the same, and a longitudinally disposed member connected with said last named means for movement relative thereto in a longitudinal vertical plane but prevented from lateral movement relative to said last named means out of said plane, whereby the vertical movement of the implement relative to the tractor is accommodated, and means connecting said arm and said member whereby said dirigible wheels are steered with said steering truck.

4. The combination with a tractor supported at least in part on a steering truck, of an implement disposed adjacent the tractor and connected therewith for relative vertical movement, dirigible wheel means supporting said implement frame, and means connecting said dirigible wheel means with said steering truck comprising an arm movable with the truck, a vertically extending yoke connected with said dirigible wheel means and shiftable with respect to said implement frame for steering said wheel means, and means carried by said arm and disposed in said yoke for shifting the latter as said steering truck is steered, said last named means being movable vertically in said yoke to accommodate the vertical movement of said implement frame relative to the tractor.

5. The combination with a tractor supported at least in part on a steering truck, of an implement frame disposed adjacent the tractor and connected therewith for relative vertical movement, dirigible wheel means supporting said implement frame, and means connecting said dirigible wheel means with said steering truck to be steered differentially therewith, said means comprising an arm swingable laterally with said truck, means connected with said dirigible wheel means to steer the latter and including a pair of longitudinally disposed members, and means connecting said arm with said longitudinal members comprising a member connected with the latter for vertical movement but prevented from lateral movement with respect thereto, whereby lateral swinging of said arm shifts said longitudinal members and the dirigible wheel means connected therewith.

6. The combination with a tractor supported at least in part on the steering truck, of an implement frame disposed adjacent the tractor and connected therewith for relative vertical movement, dirigible wheel means supporting said implement frame, a steering frame including a portion connected with said dirigible wheel means to steer the same and a rearwardly extending intermediate portion slidably mounted on said implement frame, and means connected to be moved with said steering truck and connected with said intermediate portion of the steering frame to shift the first portion thereof laterally with respect to said implement frame to steer said dirigible wheel means.

7. The combination with a tractor supported at least in part on a steering truck, of an implement frame disposed adjacent the tractor and connected therewith for relative vertical movement, dirigible wheel means supporting said implement frame, a generally T-shaped steering frame having its intermediate portion disposed rearwardly and slidably mounted on said implement frame and its arm portions disposed laterally and operatively connected with said dirigible wheel means to steer the same, means extending outwardly from said steering truck and swingable therewith, and means connecting said last named means with the rearwardly disposed intermediate portion of said steering frame and including parts arranged to provide for relative vertical movement between said steering frame and said last named means.

8. The combination with a tractor supported at least in part on a steering truck, of an implement frame disposed adjacent the tractor and connected therewith for vertical movement with respect thereto, dirigible wheel means supporting said implement frame, means including a steering frame slidably supported on the implement frame and connected with said dirigible wheel means to steer the same, an arm carried by and movable with said steering truck, a longitudinally extending member pivotally connected at one end with the outer end of said arm, means connecting the other end of said member for shifting movement with respect to said steering frame, and means carried by the latter and cooperating with said member to prevent the latter from swinging laterally with respect to said steering frame, whereby lateral swinging movement of said arm shifts said steering frame laterally to thereby steer said dirigible wheel means.

9. The combination with a tractor supported on a front steering truck, of an implement frame disposed in front of the tractor and connected therewith for vertical movement relative thereto, spaced dirigible wheels supporting the implement frame, and means connecting the dirigible wheels with the steering truck including an arm fixed to the steering truck, a steering frame supported on the implement frame and connected with the dirigible wheels to steer the same upon lateral movement of the steering frame, a steering member supported by the steering frame and movable fore and aft but restrained against lateral movement with respect thereto, and a coupling connecting the rear end of said member with said arm.

10. The combination with a tractor supported on a front steering truck, of an implement frame disposed in front of the tractor and connected therewith for vertical movement relative thereto, spaced dirigible wheels supporting the implement wheels with the steering truck including an arm fixed to the steering truck, a steering frame supported on the implement frame and connected with the dirigible wheels to steer the same upon lateral movement of the steering frame, a steering member, a coupling connecting the rear end of said member with the forward end of said arm, and means including a link pivotally connected to said steering frame and to said steering member whereby said member may have fore and aft movement relative to said steering frame but is restrained against lateral movement with respect thereto.

11. The combination with a tractor supported on a front steering truck, of an implement frame disposed in front of the tractor and connected therewith for vertical movement relative thereto, spaced dirigible wheels supporting the implement frame, and means connecting the dirigible wheels with the steering truck including an arm fixed to the steering truck, a steering frame supported on the implement frame and connected with the dirigible wheels to steer the same upon lateral movement of the implement frame, a steering member, a coupling connecting the rear end of said member with the forward end of said arm, a link pivotally connected to the steering frame and to the steering member, and a guide member carried by the steering frame and cooperating with the link to prevent the steering member from moving laterally relative to the steering frame while permitting the steering member to move longitudinally relative to the steering frame.

12. The combination with a tractor supported on a front steering truck, of an implement frame disposed in front of the tractor and connected therewith for vertical movement relative thereto, spaced dirigible wheels supporting the implement frame, and means connecting the dirigible wheels with the steering truck including an arm fixed to the steering truck, a steering frame supported on the implement frame and connected with the dirigible wheels to steer the same upon lateral movement of the steering frame, a steering member pivotally connected with the forward end of said arm, and means connecting said steering member with said steering frame and restraining said steering member against lateral movement with respect to said steering frame but permitting said steering member to swing in a longitudinal vertical plane with respect to the steering frame.

13. The combination with a tractor supported on a front steering truck, of an implement frame disposed in front of the tractor and connected therewith for vertical movement relative thereto, spaced dirigible wheels supporting the implement frame, and means connecting the dirigible wheels with the steering truck including an arm fixed to the steering truck, a steering frame supported on the implement frame and disposed in a plane spaced from the axis of said dirigible wheels and connected with the dirigible wheels to steer the same upon lateral movement of the steering frame, a steering member pivotally connected with the forward end of said arm, and means connecting said steering member with said steering frame and restraining said steering member against lateral movement with respect to said steering frame but permitting said steering member to move fore and aft and also to swing in a longitudinal vertical plane with respect to the steering frame.

14. The combination with a tractor supported on a front steering truck, of a sweep rake disposed in front of the tractor comprising a rake head, spaced dirigible wheels supporting the rake head, a pushing frame pivotally connected to the tractor and to the rake head, means for tilting the rake head with respect to the pushing frame, and means connecting the dirigible wheels with the steering truck including an arm fixed to the steering truck, a steering frame supported on the rake head and connected with the dirigible wheels to steer the same upon lateral movement of the steering frame, and a steering member pivotally connected with said arm and supported by the steering frame to move bodily fore and aft with respect thereto and to have angular movement with respect thereto in a longitudinal vertical plane, but restrained against lateral movement with respect to the steering frame.

15. The combination with a tractor supported on a steering truck, of an implement frame disposed adjacent said tractor and connected therewith for relative vertical movement, laterally spaced dirigible wheels supporting said implement frame, a transversely disposed bar carried by said implement frame, a steering frame mounted on said implement and including at least a portion slidably mounted on said bar, whereby the latter supports at least a portion of the weight of said steering frame, and means connecting said steering frame with said dirigible wheels.

16. The combination with a tractor supported on a front steering truck, of an implement frame disposed in front of the tractor and connected therewith for relative vertical movement, means connecting said implement frame with the tractor including a pair of longitudinally disposed members pivotally connected at their rear ends with the rear portion of said tractor, laterally spaced dirigible wheels including transversely disposed axle means supporting said implement frame, the forward ends of said longitudinal members being pivotally connected with said axle means to swing vertically relative thereto to accommodate the vertical movement of said implement frame, means including a steering frame slidably supported on said implement frame adjacent said axle means for steering said dirigible wheels, an arm rigidly connected with said front steering truck to swing laterally therewith, and means connecting said slidable steering frame and said arm and including the longitudinally disposed member adapted to have longitudinal shifting movement with respect to the steering frame but restrained from lateral movement with respect thereto, whereby swinging of said arm in response to steering movements of the steering truck shifts said dirigible wheels differentially with respect to said steering truck.

17. The combination with a tractor having a power lift and supported on a front steering truck, of an implement frame disposed in front of the tractor and connected therewith for relative vertical movement, spaced dirigible wheels supporting said implement frame and including transversely arranged axle means connected with said frame, means connecting said frame with the tractor including a pair of laterally spaced longitudinally extending members connected at their rear ends with the rear axle of the tractor for vertical swinging movement about a transverse axis, means pivotally connecting the forward ends of said members with said dirigible axle means, means including a steering frame laterally shiftable with respect to said axle means for steering said dirigible wheels, means including an arm swingable laterally with said front steering truck and connected with said laterally shiftable steering frame for steering said dirigible wheels, said implement frame being tiltable vertically about the transverse axis of said dirigible axle means, a rock shaft carried by at least one of said longitudinal members, links connecting said rock shaft with said implement frame whereby when said shaft is rocked said implement frame is tilted laterally about the axis of said axle means, a pendulum link carried by the tractor adjacent the rear axle thereof, means connecting said pendulum link with the power lift of the tractor, and means including a forwardly extending link connecting said pendulum link with said transverse rock shaft, whereby actuation of the tractor power lift serves to tilt said implement frame about the axis of said dirigible axle means.

18. The combination with a tractor having a power lift and supported on a front steering truck, of an implement frame disposed in front of the tractor and connected therewith for relative vertical movement, spaced dirigible wheels supporting said implement frame and including transversely arranged axle means connected with said frame, means connecting said frame with the tractor including a pair of laterally spaced longitudinally extending members connected at their rear ends with the rear axle of the tractor for vertical swinging movement about a transverse axis, means pivotally connecting the forward ends of said members with said dirigible axle means, means including a steering frame laterally shiftable with respect to said axle means for steering said dirigible wheels, means including an arm swingable laterally with said front steering truck and connected with said laterally shiftable steering frame for steering said dirigible wheels, said implement frame being tiltable vertically about the transverse axis of said dirigible axle means, a rock shaft carried by at least one of said longitudinal members, links connecting said rock shaft with said implement frame whereby when said shaft is rocked said implement frame is tilted laterally about the axis of said axle means, a short rock shaft supported rearwardly of said transverse rock shaft and link connected with the latter rock shaft, a pendulum link supported from the tractor adjacent the rear axle thereof, and link means connecting said pendulum link with said short rock shaft and with said power lift, respectively.

19. The combination with a tractor supported on a steering truck, of an implement frame disposed adjacent the tractor and connected therewith, said frame comprising a pair of spaced frame bars connected with the tractor at a pair of widely separated points, a transversely disposed cross member connected with said bars adjacent the portions thereof which are connected with the tractor at said points, and diagonal brace members connecting said cross member with both of said frame bars to form a rigid frame unit.

20. The combination with a tractor supported on a front steering truck, of an implement frame disposed in front of the tractor and connected therewith for vertical movement relative thereto, spaced dirigible wheels supporting the implement frame, and means connecting the dirigible wheels with the steering truck including an arm fixed to the steering truck, a steering frame connected with the dirigible wheels to steer the same upon lateral movement of the steering frame, a steering member having operative connection with the steering frame providing for fore and aft movement but restrained against lateral movement with respect thereto, and a coupling connecting the rear end of said member with said arm including means providing for angular movement of said member with respect to the arm in a horizontal plane and angular movement of said member with respect to said arm in a vertical plane.

21. The combination with a tractor supported on a front steering truck, of an implement frame disposed in front of the tractor and connected therewith for vertical movement relative thereto, spaced dirigible wheels supporting the implement frame and having generally longitudinally disposed steering arms, and means connecting the dirigible wheels with the steering truck including an arm fixed to the steering truck, a steering frame connected with the outer ends of the arms of the dirigible wheels to steer the latter upon lateral movement of the steering frame, a longitudinal steering member connected with said steering frame and restrained from lateral movement with respect thereto but arranged to swing vertically about a transverse axis which is shiftable laterally with the outer ends of said steering arms and with said steering frame, and a coupling connecting the rear end of said member with said steering truck arm.

FRANK D. JONES.